United States Patent [19]
Fray

[11] Patent Number: 5,621,639
[45] Date of Patent: Apr. 15, 1997

[54] PROCESS CONTROL

[76] Inventor: Paul J. Fray, 34 Madingley Road, Cambridge, CB3 0EX, England

[21] Appl. No.: 456,232

[22] Filed: May 31, 1995

Related U.S. Application Data

[63] Continuation of Ser. No. 777,275, Nov. 29, 1991, abandoned.

[30] Foreign Application Priority Data

Jun. 1, 1989 [GB] United Kingdom ............... 8912599

[51] Int. Cl.[6] ............................................. G05B 19/42
[52] U.S. Cl. ........................... 364/191; 364/188; 364/192
[58] Field of Search .................................. 364/140–197, 364/188, 189, 190, 191, 192, 474.11, 474.16–474.26, 551.01, 551.02

[56] References Cited

U.S. PATENT DOCUMENTS

| | | | |
|---|---|---|---|
| 4,635,183 | 1/1987 | Isobe et al. | 364/188 |
| 4,677,620 | 6/1987 | Sutton et al. | 364/189 |
| 4,991,076 | 2/1991 | Zifferer et al. | 364/188 |
| 5,173,869 | 12/1992 | Sakamoto et al. | 364/578 |
| 5,177,420 | 1/1993 | Wada et al. | 364/191 |

FOREIGN PATENT DOCUMENTS 158408  9/1984  Japan.

*Primary Examiner*—Roy N. Envall, Jr.
*Assistant Examiner*—Thomas E. Brown
*Attorney, Agent, or Firm*—Watson Cole Stevens Davis, P.L.L.C.

[57] ABSTRACT

An apparatus for controlling real time processes is described. A timing chart desired input and output signals to control the real time processes is displayed on a display screen. The timing chart is converted to a set of instructions for monitoring the input signals and governing the output signals. A control, operative for controlling the real time process and responsive to the instructions, monitors the input signals and governs the output signals in real time.

18 Claims, 4 Drawing Sheets

PROCESS CONTROL

This is a Continuation application Ser. No. 07/777,125 filed Nov. 29, 1991, now abandoned.

BACKGROUND OF THE INVENTION a) Field of the Invention

The present invention relates to the control of automated real-time processes, for example laboratory or manufacturing processes, by a computer or microprocessor.

b) Description of Related Art

Automation of, particularly prototype, laboratory or manufacturing processes needs to be as flexible as possible. At the same time, programs for controlling such processes need to be able to be developed quickly, whilst remaining easily modifiable. However, many researchers or process developers do not have the skills necessary to write control programs themselves, so there can be significant delays in developing suitable control programs since it is often necessary to explain the requirements to a programmer who then has to implement the required control strategy in a given programming language.

However, researchers and engineers are generally familiar with so-called timing diagrams or the like in which a representation of the control process is provided by plural graphs, each representing a given control signal or the like, displayed one above the other with the abscissa representing the elapsed time from the start of the process. Real-time process controls are often developed from diagrams of this sort, by the preparation (by a computer programmer) of a computer program implementation of a timing diagram prepared by the system developer, but the need to involve a programmer inevitably slows down the development. Furthermore, modifications that frequently need to be made during development will usually require further input from the programmer.

SUMMARY OF THE INVENTION

The present invention sets out to overcome these problems by making use of the timing chart method of describing a real-time process control strategy to develop, automatically, an instruction set for the process control.

According to the present invention therefore, apparatus for controlling a real-time process, comprises:

an image display means;

means for creating and/or editing a timing chart, of input/output signals desired to control the real-time process, on the image display means;

means for selectively converting the chart to a set of instructions for monitoring the input signals and producing the output signals; and means for processing the set of instructions to monitor the input signals and produce the output signals in order to govern the real-time process, thereby to control the real-time process.

The invention also includes apparatus for generating a set of instructions to monitor input signals and produce output signals of a real-time process, the apparatus comprising:

an image display means;

means for creating and/or editing a timing chart, of input/output signals desired to control the real-time process, on the image display means; and means for selectively converting the chart to a set of instructions for monitoring the input signals and producing the output signals.

Further, the invention includes a method of controlling a real-time process, comprising the steps of creating and/or editing a timing chart, of input/output signals desired to control the real-time process, on an image display means;

converting the chart to a set of instructions for monitoring the input signals and producing the output signals; and processing the set of instructions to monitor the input signals and produce the output signals to govern the real-time process, thereby to control the real-time process.

Preferably the apparatus of the invention will comprise a computer, the conventional image display means comprising a visual display unit of the computer, and the means for creating and/or editing a timing chart comprises a keyboard and/or computer mouse together with the computer processor when programmed appropriately. The screen representation of the timing chart is a visual representation of a data structure held in memory in the computer.

The instruction set generated by the apparatus is preferably in the form of a computer program which may be saved to a conventional storage medium such as a magnetic disk. Preferably, the program generated is in a high level language such as 'BASIC' so that modification of the program can easily be carried out directly if required, but the program may alternatively be generated in assembler source code, in machine code or in other specific code to be interpreted by a machine or instrument. This enables a program to be generated at one location where the appropriate apparatus (according to the invention) is present, and run on another computer at a separate location, any desired alteration to the control process instructing program being able to be made on the other computer, without the need for the presence of the apparatus of the invention. In other words, the control program may be generated on one computer by use of a program running on it which enables the creation and editing of the timing chart and subsequent control program generation, and can then be run on another computer which does not have the program means for generating the chart etc.

BRIEF DESCRIPTION OF THE DRAWINGS

An example of apparatus according to the present invention will now be described with reference to the accompanying drawings, in which.

DESCRIPTION OF THE INVENTION

Figure 1:
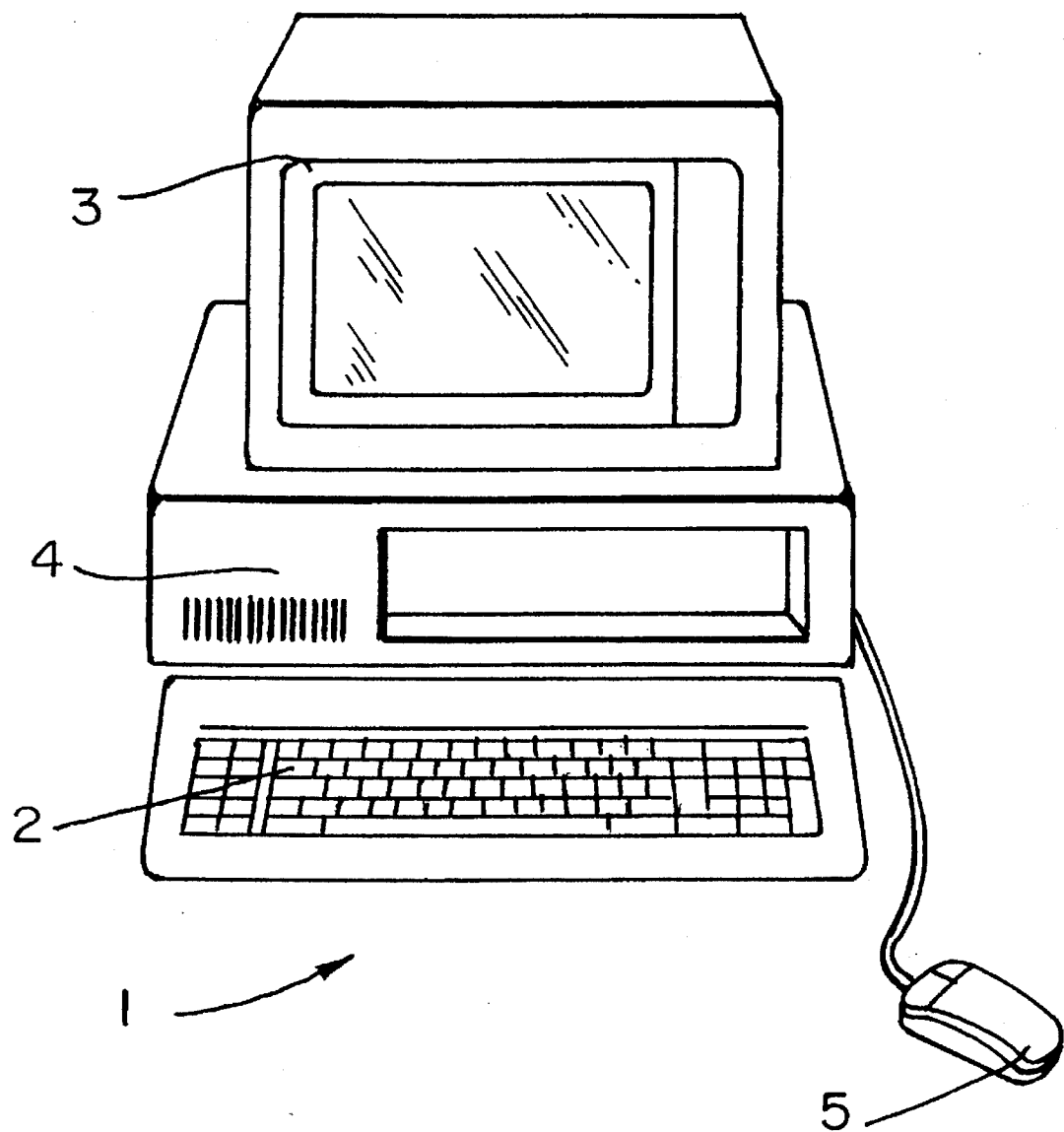
FIG. 1 is a representation of computer apparatus according to the invention.

The computer apparatus of this particular example comprises an Acorn Archimedes (Trade Mark) personal computer 1 having a keyboard 2, a screen or VDU 3, a central processing unit (CPU) 4, and, optionally, a mouse 5. The CPU also has at least one input/output port (not shown) comprising a plurality of digital input/output lines for connection to process control apparatus in the form of switches, sensors, motors and the like. The inputs/outputs may additionally or alternatively be transmitted/received through a standard serial port such as RS232 or an IEEE488 port in the form of data strings that may be set up within a text window associated with a particular event, or may be analogue signals.

In the particular example the apparatus is shown being used to generate an instruction set for the input/output signals required to control a pelican or similar pedestrian crossing system.

The notation shown on the screen is the visual representation of a data structure that is held in the computer's memory and which, itself, can be used to generate an instruction set for controlling the process. Entry of information on the screen is thus a visual representation of an entry to the underlying data structure in memory form which the screen is updated. The data structure is constructed so as to represent the relationship of causes and effects in time and, when required, is used to generate program code to enable a process to be carried out in accordance with the relationships set up in the data structure and represented on the screen.

The screen 3 displays a timing chart of the various inputs and outputs that are present, inputs having as a prefix the '>' symbol and outputs the '<' symbol, and the signals being, namely, as an input to the pelican crossing system, a button 101, and as outputs thereto, a pedestrian 'WAIT' signal 102, a redman indicator 103, a greenman indicator 104, a warning beeper 105, and red 106, amber 107 and green 108 vehicle signal lights. Each of the signal lines may either be 'on' or 'off', as represented on the chart by the signal representation being respectively high or low. In order to represent a waiting state a shaded horizontal bar (see the button signal 101) is used. The start of a timer is indicated by a solid upwards arrowhead, the duration of the timer by a horizontal line connected thereto, and the end or end and restart by a short vertical bar (see the amber signal 107 at 107'). The cancellation of a timer is represented by an open upwards arrowhead which, when drawn outside the duration of the timer, is joined to the timer line by a dotted line (see the beeper signal 105 at 105'). A dotted vertical bar (eg. 112 on greenman signal 104) represents an instruction to change a switch signal to the state in which it is shown on the chart, in case, as may sometimes happen, it is not in that state already. Thick horizontal bars 109,110,111 indicate recycling processes, in that, when the right hand end of the bar is reached, the process moves immediately to the left hand end of the bar to start again.

Alignment of the signal switches indicates that they occur at the same time of course, but alignment of an input signal switch with output signal switches (see the button 101 signal switch and the 'WAIT' 102, amber 107 and green 108 signals) indicates that the outputs are dependent on the input and that the output switches occur as a result of the input switch. This is one of a number of possible 'cause and effect' relationships that may be selected. There are three possible causes, the start of the process itself (at time 0); switches in shaded inputs (eg button 101 at 101'); and timer ends (eg. amber signal 107 at 107'). Effects are items such as a switch in an output (eg. WAIT signal 102 at 102'); the start of a timer (eg. greenman signal 104 at 104'); cancellation of a timer (eg. beeper signal 105 at 105'); taking notice of a switch (represented by the start of a shaded horizontal bar); ignoring a switch (represented by the end of a shaded horizontal bar); and the start and end of a recycling signal (eg. beeper and amber signals 105, 107 at 109' and 111', recycling of which is indicated by the bars 109 and 111 respectively). Where two causes are aligned, either one or the other can produce an effect.

The screen shows only a portion of the chart and can be scrolled left or right or up or down by use of appropriate keys on the keyboard or the mouse. The keyboard also uses the so-called 'function keys' or mouse to enable editing of the chart to add or change the signal switches, timers etc. and/or the timing, relationships etc. of signal switches, timers etc., and the screen can be expanded in the horizontal direction to give additional detail. The functions of the function keys F1 to F12 when unshifted, when shifted, when pressed with 'CONTROL' and when shifted with the 'CONTROL' key pressed as well are as shown in Tables 1 to 4 below.

The graphical notation used in the apparatus resembles the waveform used in logical analysers and in data sheets for electronic components and the example shows the range of commands for process control that can be used. For example, the amber light 107 is made to flash without regard to when it will stop, and although it is stopped at a particular time, it could be stopped by any one of a number of different events, themselves the result of other causes, unknown to the flashing process.

After the chart has been constructed on the screen to the user's satisfaction CONTROL + F7 is pressed to cause the apparatus to generate, from the data structure represented by the screen display, an instruction set for the pelican crossing control, in the form of a program. This is shown in Listing 1 attached hereto.

TABLE 1

| UNSHIFTED KEYS | |
|---|---|
| Key | Function |
| F1 | Help |
| F2 | Load data from disk |
| F3 | Save data to disk |
| F4 | Label a trace with name |
| F5 | Zoom in |
| F6 | Mark a trace for editing |
| F7 | Copy trace |
| F8 | Insert trace |
| F9 | Change trace from low to high |
| F10 | Watch switch (start shading) |
| F11 | Start timer |
| F12 | Start recycle period |

TABLE 2

| SHIFTED KEYS | |
|---|---|
| Key | Function |
| F1 | Clear all |
| F2 | Toggle line lables with I/O line nos. |
| F3 | Toggle between input/output type |
| F4 | Assign hardware line |
| F5 | Zoom out |
| F6 | Unmark a trace |
| F7 | Move trace |
| F8 | Display error message |
| F9 | Change trace from high to low |
| F10 | Ignore switch (end shading) |
| F11 | Cancel timer |
| F12 | End recycle period |

TABLE 3

KEYS WITH 'CONTROL'

| Key | Function |
| --- | --- |
| F1 | Use operating system command |
| F2 | Print |
| F3 | Move to relative time |
| F4 | Move to absolute time |
| F5 | Designate start time |
| F6 | Designate end time |
| F7 | Generate control program |
| F8 | Delete trace |
| F9 | Delete switch event |
| F10 | Delete shading event |
| F11 | Delete timer event |
| F12 | Delete recycle event |

TABLE 4

SHIFTED KEYS WITH 'CONTROL'

| Key | Function |
| --- | --- |
| F1 | Quit to Basic |
| F2 | Unused |
| F3 | Unused |
| F4 | Adjust palette |
| F5 | Open/close window |
| F6 | Unused |
| F7 | Run generated control program |
| F8 | Go to event (by trace number & time) |
| F9 | Unused |
| F10 | End and restart timer |
| F11 | Timer end |
| F12 | Toggle to/from recycle zone |

The listing is in BBC BASIC 5 and contains references to procedures (PROCxxxx—yyy) which are not shown in detail, but which are already known for use in the creation of control programs for controlling the I/O lines of ports in an Acorn Archimedes computer. These procedures are given in detail in Listing 2 attached hereto and are described in Appendix 1 hereto.

Using the program generated (Listing 1) the computer can be used to control a pelican crossing or a set of lights and switches representing such a crossing. By saving the program, and if desired translating it into machine code, the program can then be run in situ to control the real-time, real-life process from another computer or microprocessor.

Figure 2:
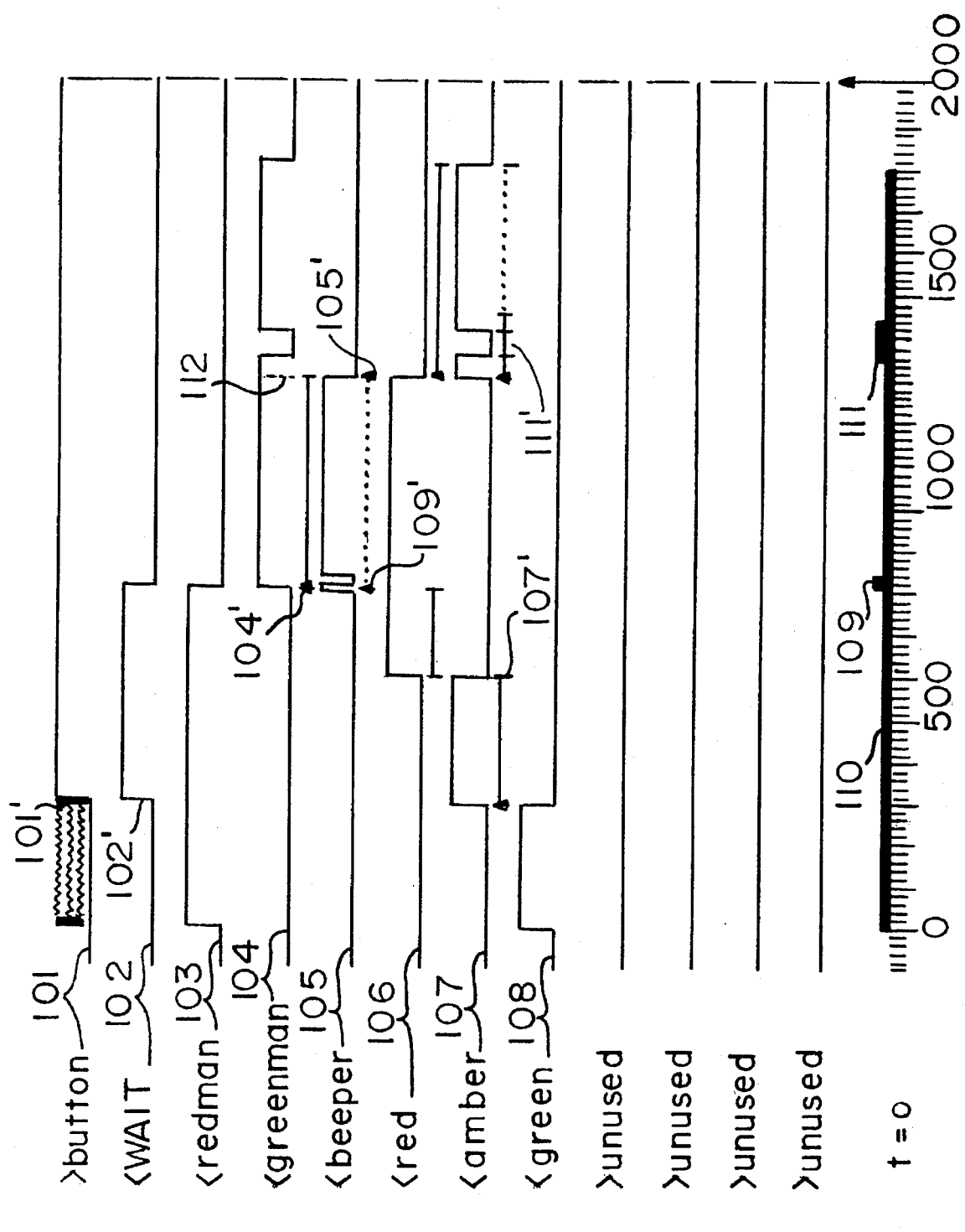
FIG. 2 is a representation of a visual display unit (VDU) screen of the apparatus showing a timing chart for a first real-time process.
Figure 3:
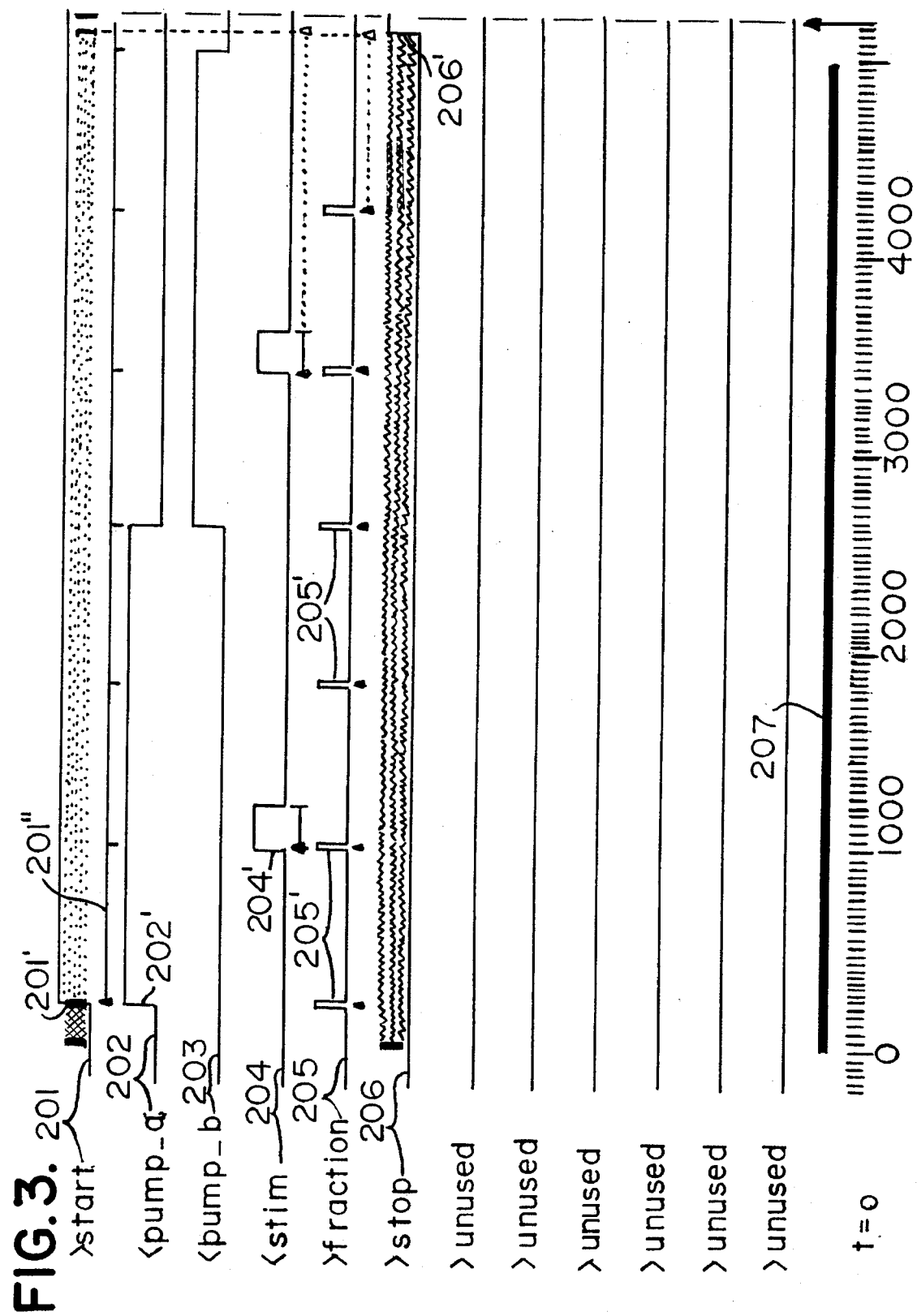
FIG. 3 is a representation of a visual display unit (VDU) screen of the apparatus showing a timing chart for a second real-time process; and, FIG. 4 shows an enlargement of a portion of FIG. 3 together with details of the associated data structure.

In the example illustrated in FIG. 3, the apparatus is shown being used to generate an instruction set for the input/output signals required to control the apparatus for and thus the method of carrying out a tissue perfusion experiment. The screen 3 shows a timing chart similar to that of FIG. 2 and identical symbols will not be separately described.

The signals associated with the process are a switch 201, outputs 202,203 for controlling a pair of pumps a and b, an output 'stim' 204 to control a device for electrical stimulation of the tissue, an output 205 to control a fraction-collector, and a stop button 206.

The process defined in FIG. 3 is started by the switch 201 at 201' and the time between samples is controlled by a repeating timer 201" on the 'start' signal. This causes pump a to start pumping a first fluid through the tissue sample at 202' and samples are taken by a fraction collector at regular intervals by pulses at 205' which cause perfusate to be moved into fresh collecting tubes. At 203' pump b starts pumping a second fluid and at the same time, at 202" pump a stops pumping. At the beginning of the collection of the central sample of perfusate using both pump a and pump b, the tissue is stimulated briefly by activating the electrical stimulator 204'. A recycle bar 207 (shown at the bottom of the screen) returns control to the switch 201 to await another start and stop button signal 206 can be used at any time to halt the process and cancel all timers. At 201' further activations of the start switch are to be ignored, for the time being, as soon as it is pressed. The lighter shading to the right of 201' indicates that an alternative cause, in this case activation of the stop switch at 206', may result in the start switch being ignored in combination with other effects. The fact that one cause is represented later in time than another does not mean that the one necessarily precedes the other—they are alternatives.

Listing 3 shows the program generated by apparatus from the timing chart of FIG. 3.

The notation shown on the screens is the visual representation of a data structure that is held in the computer's memory and which, itself, can be used to generate an instruction set for controlling the process.

Figure 4:
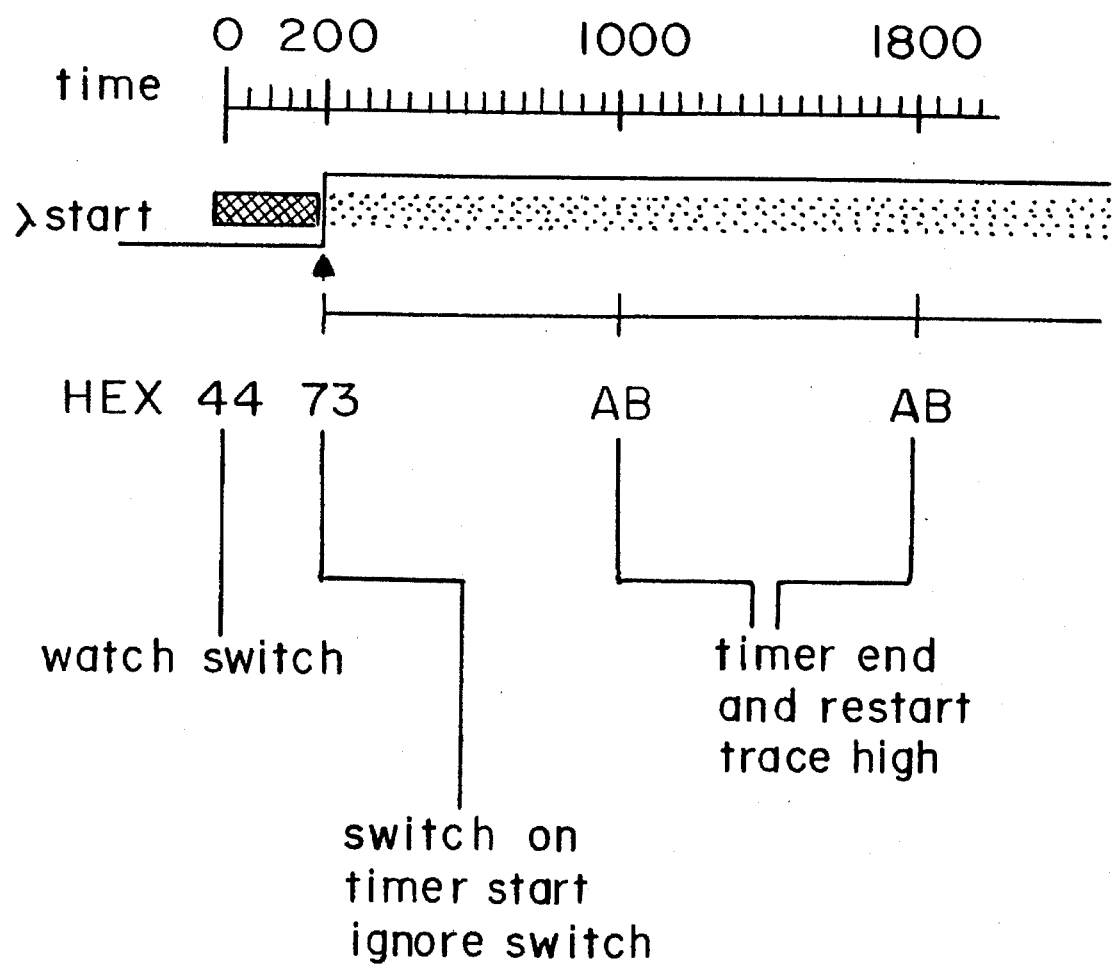

The relationship between the screen shown in FIG. 3, the underlying data structure and the program of Listing 3 can be illustrated by reference to FIG. 4. FIG. 4 illustrates a portion of the 'start' signal line of FIG. 3, with the underlying data structure for this part of the screen shown below the trace and an indication of the functions associated with it shown below that. The relative time according to the screen of FIG. 3 is shown above the trace line.

Each of the HEXADECIMAL (HEX) bytes shown as comprising the data structure elements in FIG. 4 is formed of two nybbles each resulting from four binary digits (bits) which indicate the ON or OFF state of given functions. The table below (Table 5) indicates the relationship between these functions and the bits of the two HEX nybbles.

TABLE 5

| Bit no. | 3 | 2 | 1 | 0 |
| --- | --- | --- | --- | --- |
| | | UPPER NYBBLE | | |
| Function | Timer timeout | Watch change | Timer change | Trace change |
| | | LOWER NYBBLE | | |
| Function | spare | Watched/ not watched | Timer active/ inactive | Trace level |

The table below (Table 6) illustrates for FIG. 4 how the HEX bytes result from the bit coding of Table 5.

TABLE 6

| HEX | UPPER NYBBLE | | | | LOWER NYBBLE | | | | HEX |
| --- | --- | --- | --- | --- | --- | --- | --- | --- | --- |
| | 3 | 2 | 1 | 0 | 3 | 2 | 1 | 0 | |
| 4 | 0 | 1 | 0 | 0 | 0 | 1 | 0 | 0 | 4 |
| 7 | 0 | 1 | 1 | 1 | 0 | 0 | 1 | 1 | 3 |
| A | 1 | 0 | 1 | 0 | 1 | 0 | 1 | 1 | B |
| A | 1 | 0 | 1 | 0 | 1 | 0 | 1 | 1 | B |

The underlying data structure results in program code being generated (when CONTROL+F7 is pressed) as shown in Listing 3, the relevant portion relating to what is shown in FIG. 4 and Tables 5 and 6 being at lines 260 to 380 (these lines also include code generated from other traces/lines of the timing chart of FIG. 3 over the same period of time.

The examples show the generation of programs for controlling single processes, but a program may be generated in a form which enables simultaneous control of multiple identical processes or devices.

Although not shown in FIGS. 2 or 3, for simplicity, any event may have, associated with it, a text window which may contain explanatory data. The window can be accessed, when the cursor is located at the particular event by means of a function key combination assigned to this task. In this example the function key combination used is SHIFT+CONTROL+F5. Such a text window can be used to predefine a number of events of a specified type that must occur to produce a cause, for example the voltage to be produced on an analogue port or the required threshold to generate an analogue cause, a number of times a process is to recycle, or data to be output through for example the serial or IEEE port when the event occurs or the pattern of incoming data expected on the serial or IEEE port.

The system accommodates the occurrence of an event dependent on two causes having occurred in either order of occurrence of the two causes.

APPENDIX 1

Defined entities

Several items in the description below appear in triangular brackets, e.g. <sw_num>. These entities are defined here for reference when determining correct syntax.

<chan_num>   an expression whose integer result is the physical number of an analogue input channel.

<dac>        an expression whose integer result is the physical number of a digital-to-analogue converter.

<error>      an error number: the corresponding message is given by FNreport(<error>).

<expr>       an expression yielding a numeric result.

<fn_name>    a string expression which gives the name of a a service function.

<off>        the logical "off" <state>: i.e. drawing no current if govn'd (an output) or negated if free (an input). N.B. The data bit in the I/O chip may be a 0 or a 1, depending on the interface.

<on>         the logical "on" <state>: i.e. drawing current if govn'd (an output) or asserted if free (an input). N.B. The data bit in the I/O chip may be a 0 or a 1, depending on the interface.

<parm>       an <expr> whose integer result is stored and passed to a service function when it is called in response to an event.

<port_num>   an <expr> whose integer result is the physical number of a group of eight consecutive switches ranging from <port_num>*8 to <port_num>*8+7.

<ret>        a variable to which a procedure or function returns a result.

<sw_num>     an expression whose integer result is the physical number of a digital I/O line.

<state>      <on> or <off>.

<time>       an <expr> whose integer result is a time in centiseconds.

<t_num>      an <expr> whose integer result is the number of a timer.

SUBSTITUTE SHEET

Constants

| | |
|---|---|
| On | has the value -1 (TRUE). |
| Off | has the value 0 (FALSE). |
| Over | has the value 1 (i.e. neither TRUE nor FALSE). |

Pseudo-variables

| | |
|---|---|
| FNamax | the highest numbered analogue input channel in the system. |
| FNdmax | the highest numbered digital I/O line in the system. |
| FNpipes | the number of events currently piped. |

Linking events to service functions

PROCpipe_timer(<t_num>, <time>, <expr>, "FN<fn_name>(", <parm>, <ret>)

| | |
|---|---|
| <t_num> | <expr>: integer result is timer number (0 to 31). |
| <time> | <expr>: integer result is a time in centiseconds. |
| <expr> | dummy: set to 0. |
| "FN<fn_name>(" | the name of a service function, optionally followed by extra parameters. |
| <parm> | <expr>: evaluated as an integer. |
| <ret> | a variable to which an error code will be returned. |

PROCpipe_timer() establishes a pipe between a timer and a service function. It sets timer number <t_num> to <time> centiseconds, and it starts counting down immediately. There are 32 timers, numbered 0 to 31.

<parm> is evaluated and saved for use when the timer reaches zero. When this happens, provided that the program has entered PROCwait() (see below), FN<fn_name> is called, and the saved value of <parm> is passed to its formal parameter. <expr> is a dummy for future use: it must be present, and should be set to zero.

If the timer is already piped, the new call supercedes the old one. Timers have only one "life": i.e., once the service function has been executed, the pipe is cancelled and the timer will not restart - if required, this must be done with a further PROCpipe_timer() statement in the service function. A timer can be stopped early and the pipe cancelled by PROCkill_timer() or PROCkill_all (see below).

On exit <ret> is set to zero if the PROC succeeded, and to an <error> if it failed. Possible errors are a non-existent timer, bad function syntax, non-existent function, bad DEFFN statement or the service function returning a non-zero result when probed.

SUBSTITUTE SHEET

F..imer(<t_num>, <..st>)

FNtimer() returns the current value of timer number <t_num>. If the timer is not piped, it returns zero; and if it is piped it returns the time in centiseconds the timer has left to run. If PROCwait() (see below) is late servicing a timer (held up servicing something else), then a negative value is returned, indicating the size of the delay: this is usually very small in practice.

On exit <ret> is set to zero if the FN succeeded, and to an <error> if it failed. The most likely error is trying to read a non-existent timer.

PROCkill_timer(<t_num>, <ret>)

PROCkill_timer() stops timer number <t_num> and cancels the pipe linking it to a service function: the service function is not called. If the timer has not been piped, then nothing happens.

On exit <ret> is set to zero if the PROC succeeded, and to an <error> if it failed. The most likely error is trying to kill a non-existent timer.

PROCpipe_switch(<sw_num>, <dir>, <expr>, "FN<fn_name>(", <parm>, <ret>)

| | |
|---|---|
| <sw_num> | <expr>: integer result is the number of a digital input line. |
| <dir> | <expr>: integer result is the direction of change. |
| <expr> | dummy: set to 0. |
| "FN<fn_name>(" | The name of a service function, optionally followed by extra parameters. |
| <parm> | <expr>: evaluated as an integer. |
| <ret> | a variable to which an error code will be returned. |

PROCpipe_switch() establishes a pipe between a free switch (digital input line) and a service function. It specifies that a change of <state> on switch number <sw_num> is to cause service function <fn_name> to be called. (In Issue x0.02, <sw_num> may not be greater than 31: i.e., only switches 0 to 31 may be piped).

The direction of change is given by <dir>: if <dir> is TRUE, a change from <off> to <on> will be effective, but not from <on> to <off>; if <dir> is FALSE, a change from <on> to <off> will be effective, but not from <off> to <on>; if <dir> is any other value, a change of <state> will be effective, regardless of direction.

<parm> is evaluated and saved for use when a change of the specified direction occurs. When this happens, provided that the program has entered PROCwait() (see below), FN<fn_name> is called, and the saved value of <parm> is passed to its formal parameter. <expr> is a dummy for future use: it must be present, and should be set to zero.

If the <sw_num> is already piped, then the new call supercedes the old one. The pipe set up by this PROC remains in force indefinitely: each change of <state> of the specified direction will cause the service function to be called. The pipe can be cancelled with a call to PROCkill_switch() or PROCkill_all (see below). Note that if the switch is govn'd (an output) the PROC will succeed, but the service function will not be called when the switch changes state.

On exit <ret> is set to zero if the PROC succeeded, and to an <error> if it failed. Possible errors are a non-existent switch, a switch number greater than 31, bad function syntax, non-existent function, bad DEFFN statement or the service function returning a non-zero result when probed.

PROCkill_switch(<sw_num>, <ret>)

PROCkill_switch() cancels the pipe between the switch <sw_num> and the service function specified by the most recent call to PROCpipe_switch(). If the switch is not piped, or is a govn'd switch (i.e. a digital input line) then nothing happens.

On exit <ret> is set to zero if the PROC succeeded, and to an <error> if it failed. The most likely error is a non-exitent switch.

PROCkill_all

PROCkill_all cancels all outstanding pipes for timers and switches. It is usually used at the beginning of a program to ensure that there is nothing left over from an old program, and also it is the way to leave PROCwait() (see below) when terminating a program.

PROCwait(<ret>)

PROCwait() is called when all the initial pipes for a program have been established. When a piped event occurs (a switch changing to the specified <state> or a timer reaching zero), it is from PROCwait() that the appropriate service function is called.

In addition to manipulating the I/O, service functions may set up new pipes and cancel others before returning: the program will stay in PROCwait() until all pipes have been cancelled. A common way of leaving PROCwait() is for a service function to make a call to PROCkill_all: PROCwait() then finds all pipes cancelled and returns. Service functions usually return zero, to indicate success; but if they return a non-zero result, PROCwait() terminates immediately, returning the value obtained from the service function in <ret>.

On return from PROCwait(), the main program continues from the statement immediately following the PROCwait() statement. Usually, this will signal the end of the program, and it may do some tidying up or print some results before ending. However, it is possible to set up further pipes and call PROCwait() again.

Direction of digital input/output lines

PROCfree_switch(<sw_num>, <ret>)

PROCfree_switch() frees the switch number <sw_num> for control by the outside world: i.e. it makes it an input to the computer. On exit <ret> is set to zero if the PROC succeeded, and to an <error> if it failed. The most likely error is specifying a non-existent switch.

SUBSTITUTE SHEET

PROCgovn_switch(<sw_num>, <ret>)

PROCgovn_switch() (literally GOVerN SWITCH) takes over the switch number <sw_num> for control by the computer: i.e. it makes it an output. On exit <ret> is set to zero if the PROC succeeded, and to an <error> if it failed. The most likely error is specifying a non-existent switch.

PROCfree_port(<port_num>, <ret>)

PROCfree_port() frees the eight switches in port number <port_num> for control by the outside world: i.e. it makes them all inputs. On exit <ret> is set to zero if the PROC succeeded, and to an <error> if it failed. The most likely error is specifying a non-existent port.

PROCgovn_port(<port_num>, <ret>)

PROCgovn_port() (literally GOVerN PORT), takes over the eight switches in in port number <port_num> for control by the computer: i.e. it makes them all outputs. On exit <ret> is set to zero if the PROC succeeded, and to an <error> if it failed. The most likely error is specifying a non-existent port.

FNstatus(<sw_num>, <ret>)

FNstatus() returns the direction of switch number <sw_num>: the result is FALSE if it is a free switch (an input), and TRUE if it is a govn'd switch (an output). On exit <ret> is set to zero if the FN succeeded, and to an <error> if it failed. The most likely error is specifying a non-existent switch.

Manipulation of digital I/O lines

PROCswitch_on(<sw_num>, <ret>)

PROCswitch_on() puts switch number <sw_num> into the <on> state, if it is a govn'd switch (an output). If it is a free switch (an input), or if it is already <on>, then nothing happens. On exit <ret> is set to zero if the PROC succeeded, and to an <error> if it failed. The most likely error is specifying a non-existent switch.

PROCswitch_off(<sw_num>, <ret>)

PROCswitch_off() puts switch number <sw_num> into the <off> state, if it is a govn'd switch (an output). If it is a free switch (an input), or if it is already <off>, then nothing happens. On exit <ret> is set to zero if the PROC succeeded, and to an <error> if it failed. The most likely error is specifying a non-existent switch.

PROCswitch_over(<sw_num>, <ret>)

PROCswitch_over() inverts switch number <sw_num>, if it is govn'd (an output); turning it <on> if it was <off>, or turning it <off> it was <on>. If it is a free switch (an input) nothing happens. On exit <ret>

SUBSTITUTE SHEET is set to zero if the PROC succeeded, and to an <error> if it failed. The most likely error is specifying a non-existent switch.

PROCswitch(<sw_num>, <expr>, <ret>)

PROCswitch() puts switch number <sw_num> into the <state> specified by <expr>. Unless the switch is free (an input), in which case nothing happens, then the switch is turned <off> if <expr> is zero, and it is turned <on> if <expr> is non-zero.

On exit <ret> is set to zero if the PROC succeeded, and to an <error> if it failed. The most likely error is specifying a non-existent switch.

FNswitch(<sw_num>, <ret>)

FNswitch() returns the state of switch number <sw_num>: the result is TRUE if the switch is <on>, or FALSE if it is <off>. If the switch is govn'd (an output), the result is the current setting; and if the switch is free (an input), the result is the state at the instant the switch was read.

On exit <ret> is set to zero if the FN succeeded, and to an <error> if it failed. The most likely error is specifying a non-existent switch.

PROCport(<port_num>, <expr>, <ret>)

PROCport() puts the eight switches within port number <port_num> into the <state> specified by the least significant eight bits of <expr>. For n=0 to 7, if bit n of <expr> is a 1, then switch number <port_num>*8+n is switched <on>; and if bit n of <expr> is a 0, then switch number <port_num>*8+n is switched <off>. If any switch was free (an input) or was already in the <state> specified, nothing happens to it.

On exit <ret> is set to zero if the PROC succeeded, and to an <error> if it failed. The most likely error is specifying a non-existent port.

FNport(<port_num>, <ret>)

FNport() returns the <state> of the eight switches within port number <port_num> in the least significant eight bits of its result. For n=0 to 7, bit n gives the <state> of switch number <port_num>*8+n: if the switch is <on>, the bit is a 1, and if the switch is <off> the bit is a 0. For switches that are govn'd (outputs) the result is the current setting, and for for switches that are free (inputs) the result is the state at the instant the switches were read.

On exit <ret> is set to zero if the FN succeeded, and to an <error> if it failed. The most likely error is specifying a non-existent port.

SUBSTITUTE SHEET

Analogue Input and Output

PROCdac(<dac>, <expr>, <ret>)

PROCdac() sets digital-to-analogue converter number <dac> to the value given by the 12 least significant bits of <expr>, when evaluated as an integer. On exit <ret> is set to zero if the PROC succeeded, and to an <error> if it failed. The most likely error is specifying a non-existent DAC.

FNadc(<chan_num>, <ret>)

FNadc() performs an analogue-to-digital conversion on analogue input channel number <chan_num>. On exit <ret> is set to zero if the FN succeeded, and to an <error> if it failed. The most likely error is specifying a non-existent channel.

ARACHNID error messages

Bad function syntax

The function name given in a PROCpipe_ statement did not have the form:

FN<name>([<parm>,]^

The first two characters must be "FN"; next there must be the name of a function followed by a "("; this may be followed by one or more parameters ending in a ",".

Can't use SWITCH

The switch number given in a PROCpipe_switch() statement was larger than 31 (the current restriction on pipeable switches).

No such analogue line

The analogue input channel or the DAC number exceeded the maximum present in the system.

No such PORT

The port number specified was greater than the maximum present in the system.

No such SWITCH

The switch number specified was greater than the maximum present in the system.

SUBSTITUTE SHEET

No such TIMER

The timer number specified was greater than 31.

Not a service function

A function was specified as a service function in a PROCpipe_ statement, but responded to a probe call with a non-zero result, indicating that the programmer had specified that it was not to be used as a service function.

ARACHNID Error codes and messages

| | |
|---|---|
| 72 | No such analogue line |
| 91 | No such PORT |
| 94 | No such SWITCH |
| 101 | No such TIMER |
| 103 | Can't use SWITCH |
| 105 | Bad function syntax |
| 120 | Not a service function |

SUBSTITUTE SHEET

LISTING 1

```
10 REM > ]giprog.PELICAN    - created: Mon,21 May 1990.13:59:23
20 DIM countonx(31),countoffx(31)
30 DIM L$(31),vx(31)
40 PROCinit
50 PROCarachnidprogram
60 END
70 :
80 DEFPROCarachnidprogram
90 LOCAL q%
100 LOCAL ERROR
110 ON ERROR LOCAL PROCerror:ENDPROC
120 PROCkill_all
130 L$()=STRING$(10," ")
140 L$(0)=">button     ":button=0:PROCfree_switch(button,E%)
150 L$(1)="<WAIT       ":WAIT=1:PROCgovn_switch(WAIT,E%)
160 L$(2)="<redman     ":redman=2:PROCgovn_switch(redman,E%)
170 L$(3)="<greenman   ":greenman=3:PROCgovn_switch(greenman,E%)
180 L$(4)="<beeper     ":beeper=4:PROCgovn_switch(beeper,E%)
190 L$(5)="<red        ":red=5:PROCgovn_switch(red,E%)
200 L$(6)="<amber      ":amber=6:PROCgovn_switch(amber,E%)
210 L$(7)="<green      ":green=7:PROCgovn_switch(green,E%)
220 q%=FNstart
230 PROCwait(E%):IF E% ERROR E%,FNreport(E%)
240 PROCresults
250 ENDPROC
260 :
270 DEFFNstart
280 PROCpipe_switch(button,On,0,"FNbutton_switch1(",0,E%)
290 PROCswitch_on(redman,E%):countonx(redman)+=1
300 PROCswitch_on(green,E%):countonx(green)+=1
310 =0
320 :
330 DEFFNbutton_switch1(P%,R%)
340 IF R%=0 =0
350 countonx(button)+=1
360 PROCkill_switch(button,E%)
370 PROCswitch_on(WAIT,E%):countonx(WAIT)+=1
380 PROCswitch_on(amber,E%):countonx(amber)+=1
390 PROCpipe_timer(amber,300,0,"FNamber_timer1(",0,E%)
400 PROCswitch_off(green,E%):countoffx(green)+=1
410 =0
420 :
430 DEFFNamber_timer1(P%,R%)
440 IF R%=0 =0
450 PROCswitch_on(red,E%):countonx(red)+=1
460 PROCpipe_timer(red,200,0,"FNred_timer1(",0,E%)
470 PROCswitch_off(amber,E%):countoffx(amber)+=1
480 =0
490 :
500 DEFFNred_timer1(P%,R%)
510 IF R%=0 =0
520 PROCswitch_off(WAIT,E%):countoffx(WAIT)+=1
530 PROCswitch_off(redman,E%):countoffx(redman)+=1
540 PROCswitch_on(greenman,E%):countonx(greenman)+=1
550 PROCpipe_timer(greenman,500,0,"FNgreenman_timer1(",0,E%)
560 PROCswitch_on(beeper,E%):countonx(beeper)+=1
570 PROCpipe_timer(beeper,10,0,"FNbeeper_timer1(",0,E%)
580 =0
590 :
600 DEFFNbeeper_timer1(P%,R%)
610 IF R%=0 =0
620 PROCswitch_off(beeper,E%):countoffx(beeper)+=1
630 PROCpipe_timer(beeper,10,0,"FNbeeper_timer2(",0,E%)
```

```
 640 =0
 650 :
 660 DEFFNbeeper_timer2(P%,R%)
 670 IF R%=0 =0
 680 PROCswitch_on(beeper,E%):countonx(beeper)+=1
 690 PROCpipe_timer(beeper,10,0,"FNbeeper_timer3(",0,E%)
 700 =0
 710 :
 720 DEFFNbeeper_timer3(P%,R%)
 730 IF R%=0 =0
 740 =FNbeeper_timer1(0,-1)
 750 :
 760 DEFFNgreenman_timer1(P%,R%)
 770 IF R%=0 =0
 780 PROCswitch_on(greenman,E%):countonx(greenman)+=1
 790 PROCswitch_off(beeper,E%):countoffx(beeper)+=1
 800 PROCkill_timer(beeper,E%)
 810 PROCswitch_off(red,E%):countoffx(red)+=1
 820 PROCpipe_timer(red,500,0,"FNred_timer2(",0,E%)
 830 PROCswitch_on(amber,E%):countonx(amber)+=1
 840 PROCpipe_timer(amber,50,0,"FNamber_timer2(",0,E%)
 850 =0
 860 :
 870 DEFFNamber_timer2(P%,R%)
 880 IF R%=0 =0
 890 PROCswitch_off(greenman,E%):countoffx(greenman)+=1
 900 PROCswitch_off(amber,E%):countoffx(amber)+=1
 910 PROCpipe_timer(amber,50,0,"FNamber_timer3(",0,E%)
 920 =0
 930 :
 940 DEFFNamber_timer3(P%,R%)
 950 IF R%=0 =0
 960 PROCswitch_on(greenman,E%):countonx(greenman)+=1
 970 PROCswitch_on(amber,E%):countonx(amber)+=1
 980 PROCpipe_timer(amber,50,0,"FNamber_timer4(",0,E%)
 990 =0
1000 :
1010 DEFFNamber_timer4(P%,R%)
1020 IF R%=0 =0
1030 =FNamber_timer2(0,-1)
1040 :
1050 DEFFNred_timer2(P%,R%)
1060 IF R%=0 =0
1070 PROCswitch_off(greenman,E%):countoffx(greenman)+=1
1080 PROCswitch_off(amber,E%):countoffx(amber)+=1
1090 PROCkill_timer(amber,E%)
1100 =FNstart
1110 :
1120 DEFPROCresults
1130 LOCAL i%,j%,k%
1140 PRINT'''"  SWITCH          ONs       OFFs      SWITCH          ONs       OFFs"'
1150 j%=0
1160 FOR i%=0 TO 31
1170   IF L$(i%)<>"          " THEN v%(j%)=i%:j%+=1
1180 NEXT
1190 j%+=1
1200 FOR k%=0 TO j%DIV2-1
1210   FOR i%=0 TO j%DIV2 STEP j%DIV2
1220     IF i%+k%<j%-1 THEN
1230       IF i% PRINT"    ";
1240       PRINT" ";L$(v%(i%+k%));
1250       IF LEFT$(L$(v%(i%+k%)),1)=">" PRINT"    ";
1260       PRINTFNdecalign(countonx(v%(i%+k%)));
1270       IF LEFT$(L$(v%(i%+k%)),1)="<" THEN
```

```
1280          PRINTFNdecalign(countoffx(vx(ix+kx)));
1290        ELSE
1300          PRINT"      ";
1310        ENDIF
1320      ENDIF
1330    NEXT
1340    PRINT
1350 NEXT
1360 ENDPROC
1370 :
1380 DEFFNdecalign(dx)=RIGHT$("         "+STR$(dx),9)
1390 :
1400 DEFPROCerror
1410 IF (ERRAND&FF)=17 THEN PROCresults
1420 REPORT:PRINT" at line ";ERL
1430 ENDPROC
>
```

LISTING 2

```
   10 ARACHNID Iss x0.03 Real-Time extension for BBC BASIC V (C) 1989 Paul F
ray Ltd
   20 REMcu
   30 DEFPROCkill_all
   40 LOCAL Z%
   50 FOR Z%=0 TO 4 STEP 4:reqreg!Z%=0:flags!Z%=0:NEXT
   60 pipes%=0
   70 ENDPROC
   80 :
   90 DEFPROCpipe_timer(t%,time%,n%,fn$,parm%, RETURN E%)
  100 LOCAL T%
  110 E%=FNchktim: IF E% ENDPROC
  120 E%=FNchkfn: IF E% ENDPROC
  130 IF time%=0 time%=1
  140 T%=1<<t%
  150 IF !reqreg AND T% THEN
  160    !reqreg=!reqreg AND NOT T%
  170    !flags=!flags AND NOT T%
  180    pipes%=pipes%-1
  190 ENDIF
  200 timers!(t%<<2)=-time%
  210 !reqreg=!reqreg OR T%
  220 pipes%=pipes%+1
  230 fn$(t%)=fn$:parm%(t%)=parm%
  240 ENDPROC
  250 :
  260 DEFPROCpipe_switch(s%,dir%,n%,fn$,parm%, RETURN E%)
  270 LOCAL S%
  280 E%=FNchkpipe: IF E% ENDPROC
  290 E%=FNchkfn: IF E% ENDPROC
  300 S%=1<<s%
  310 IF !sw_req AND S% THEN
  320    !sw_req=!sw_req AND NOT S%
  330    !sw_flag=!sw_flag AND NOT S%
  340    pipes%=pipes%-1
  350 ENDIF
  360 CASE dir% OF
  370    WHEN TRUE: !ignreg=!ignreg AND NOT S%: !dirreg=!dirreg AND NOT S%
  380    WHEN FALSE: !ignreg=!ignreg AND NOT S%: !dirreg=!dirreg OR S%
  390    OTHERWISE: !ignreg=!ignreg OR S%
  400 ENDCASE
  410 !sw_req=!sw_req OR S%
  420 pipes%=pipes%+1
  430 fn$(s%+32)=fn$:parm%(s%+32)=parm%
  440 ENDPROC
  450 :
  460 DEFPROCkill_timer(t%, RETURN E%)
  470 E%=FNchktim: IF E% ENDPROC
  480 t%=1<<t%
  490 IF !reqreg AND t% THEN
  500    !reqreg=!reqreg AND NOT t%
  510    !flags=!flags AND NOT t%
  520    pipes%=pipes%-1
  530 ENDIF
  540 ENDPROC
  550 :
  560 DEFPROCkill_switch(s%, RETURN E%)
  570 E%=FNchkpipe: IF E% ENDPROC
  580 s%=1<<s%
  590 IF !sw_req AND s% THEN
  600    !sw_req=!sw_req AND NOT s%
  610    !sw_flag=!sw_flag AND NOT s%
  620    pipes%=pipes%-1
```

```
630 ENDIF
640 ENDPROC
650 :
660 DEFFNtimer(tx, RETURN Ex)
670 Ex=FNchktim: IF Ex ENDPROC
680 IF !reqreg AND 1<<t% THEN =-timers!(t%<<2) ELSE =0
690 :
700 DEFFNchktim
710 IF tx<0 OR t%>31 THEN =101 ELSE =0
720 :
730 DEFFNchkpipe
740 IF sx<0 OR sx>=(?nmpipts<<3) THEN =103 ELSE =0
750 :
760 DEFFNchksw
770 IF sx<0 OR sx>!dmax THEN =94 ELSE =0
780 :
790 DEFFNchkport
800 IF px<0 OR (px<<3)>!dmax THEN =91 ELSE =0
810 :
820 DEFFNchkadc
830 IF cx<0 OR cx>!amax THEN =72 ELSE =0
840 :
850 DEFFNchkdac
860 IF cx<0 OR (cx<<2)>!amax THEN =72 ELSE =0
870 :
880 DEFFNchkfn
890 LOCAL ERROR
900 ON ERROR LOCAL IF ERR=29 OR ERR=30 OR ERR=31 THEN =ERR ELSE PRINT'REPO
RT$" at line ";ERL: END
910 IF LEFT$(fn$,2)<>"FN" OR LENfn$<4 OR INSTR(fn$,"(")=0 OR RIGHT$(fn$)<>
")" AND RIGHT$(fn$)<>"," THEN =105
920 IF EVAL(fn$+"0,FALSE)") THEN =120
930 =0
940 :
950 DEFPROCwait(RETURN Ex)
960 LOCAL Zx
970 LOCAL ERROR
980 ON ERROR LOCAL IF ERR=17 Ex=ERR: ENDPROC ELSE PRINT 'REPORT$" at line
";ERL: END
990 WHILE pipesx>0
1000   Zx=USRwait
1010   IF Zx<32 THEN !reqreg=!reqreg AND NOT (1<<Zx): pipesx=pipesx-1
1020   Ex=EVAL(fn$(Zx)+"parmx(Zx),TRUE)")
1030   IF Ex ENDPROC
1040 ENDWHILE
1050 Ex=0
1060 ENDPROC
1070 :
1080 DEFPROCclaim
1090 Rx=EXT#OPENIN"$.Library.registers"
1100 Wx=EXT#OPENIN"$.Library.wait"
1110 Cx=EXT#OPENIN"$.Library.code"
1120 CLOSE#0
1130 HIMEM=HIMEM-Cx-Wx-Rx-256 AND &FFFFFFFC
1140 PROCinit
1150 ?claimed=0
1160 Tx=TIME: REPEAT UNTIL TIME>Tx
1170 IF ?claimed=0 THEN
1180   OSCLI"LOAD $.Library.registers "+STR$~HIMEM
1190   OSCLI"LOAD $.Library.wait "+STR$~(HIMEM+Rx)
1200   OSCLI"LOAD $.Library.code "+STR$~(HIMEM+Rx+Wx)
1210   SYS"I/O_Podule_Hardware" TO ,Ix
1220   !iopod=Ix AND &FF00FFFF
1230   SYS"OS_Claim",&1C,HIMEM+Rx+Wx,HIMEM
```

```
1240    PROCio
1250    ENDIF
1260    PRINT"ARACHNID Issue x0.03 (C) Paul Fray Ltd 1989"
1270    ?(PAGE+1)=255: ?(TOP-1)=0
1280    END
1290    :
1300    DEFPROCvariables
1310    On=TRUE: Off=FALSE: Over=1
1320    osbyte=6: readfred=146: writefred=147: readjim=148: writejim=149: read
sheila=150: writesheila=151
1330    P%=HIMEM: PROCregisters
1340    ENDPROC
1350    :
1360    DEFPROCinit
1370    LOCAL P%,Z%
1380    PROCvariables
1390    DIM report$(127), fn$(63), parm%(63)
1400    PROCreports
1410    err=0: pipes%=0
1420    ENDPROC
1430    :
1440    DEFPROCreports
1450      report$(6)="Type mismatch"
1460      report$(17)="Escape"
1470      report$(29)="No such function"
1480      report$(30)="Bad call of function"
1490      report$(31)="Arguments of function incorrect"
1500      report$(72)="No such analogue line"
1510      report$(91)="No such PORT"
1520      report$(94)="No such SWITCH"
1530      report$(101)="No such TIMER"
1540      report$(103)="Can't use SWITCH"
1550      report$(105)="Bad function syntax"
1560      report$(120)="Not a service function"
1570    ENDPROC
1580    :
1590    DEFPROCregisters
1600    [ OPT 0
1610     ALIGN
1620    .timers
1630    ]
1640    P%=P%+32*4
1650    [ OPT 0
1660    .flags
1670     EQUD 0
1680    .sw_flag
1690     EQUD 0
1700    .reqreg
1710     EQUD 0
1720    .sw_req
1730     EQUD 0
1740    .dirreg
1750     EQUD 0
1760    .ignreg
1770     EQUD 0
1780    .tick
1790     EQUD 0
1800    .oldtick
1810     EQUD 0
1820    .softiodef
1830     EQUD 0
1840     EQUD 0
1850     EQUD 0
1860     EQUD 0
```

```
1870    EQUD 0
1880    EQUD 0
1890    EQUD 0
1900    EQUD 0
1910   .oldiodef
1920    EQUD 0
1930   .softport
1940    EQUD 0
1950    EQUD 0
1960    EQUD 0
1970    EQUD 0
1980    EQUD 0
1990    EQUD 0
2000    EQUD 0
2010    EQUD 0
2020   .claimed
2030    EQUD !claimed
2040   .dmax
2050    EQUD !dmax
2060   .amax
2070    EQUD !amax
2080   .smax
2090    EQUD !smax
2100   .iopod
2110    EQUD !iopod
2120   .jimsheila
2130    EQUD !jimsheila
2140   .dbase
2150    EQUD !dbase
2160   .abase
2170    EQUD !abase
2180   .sbase
2190    EQUD !sbase
2200   .onemegpage
2210    EQUW !onemegpage
2220   .nmpipts
2230    EQUB !nmpipts
2240   .iocode
2250    EQUB !iocode
2260   .portab
2270    EQUD !portab
2280    EQUD &30312021
2290    EQUD &50514041
2300    EQUD &70716061
2310    EQUD &90918081
2320    EQUD &B0B1A0A1
2330    EQUD &D0D1C0C1
2340    EQUD &F0F1E0E1
2350   .invtab
2360    EQUD !invtab
2370    EQUD &FFFFFFFF
2380    EQUD &FFFFFFFF
2390    EQUD &FFFFFFFF
2400    EQUD &FFFFFFFF
2410    EQUD &FFFFFFFF
2420    EQUD &FFFFFFFF
2430    EQUD &FFFFFFFF
2440   .wait
2450    ]
2460 ENDPROC
2470 :
2480 DEF FNswitch(s%, RETURN E%)
2490 LOCAL P%, B%
2500 E%=FNchksw: IF E% THEN =0
```

SUBSTITUTE SHEET

```
2510  P%=s%>>>3: B%=1<<(s%AND7)
2520  IF softiodef?P% AND B% THEN
2530     s%=softport?P%
2540  ELSE PROCpagedig
2550     SYS osbyte, ?iocode, portab?P% TO ,,s%
2560     PROCrestpage
2570  ENDIF
2580  =((s% EOR invtab?P%) AND B%) <> 0
2590  :
2600  DEF FNstatus(s%, RETURN E%)
2610  E%=FNchksw: IF E% THEN =0
2620  = (softiodef?(s%>>>3) AND 1<<(s% AND 7)) <> 0
2630  :
2640  DEF PROCswitch(s%,st%, RETURN E%)
2650  IF st% PROCswitch_on(s%,E%) ELSE PROCswitch_off(s%,E%)
2660  ENDPROC
2670  :
2680  DEF PROCswitch_on(s%, RETURN E%)
2690  LOCAL P%, B%
2700  E%=FNchksw: IF E% ENDPROC
2710  P%=s%>>>3: B%=1<<(s%AND7)
2720  s%=softport?P% EOR invtab?P% OR B% EOR invtab?P%
2730  softport?P% = s%
2740  PROCpagedig
2750  SYS osbyte, ?iocode+1, portab?P%, s%
2760  PROCrestpage
2770  ENDPROC
2780  :
2790  DEF PROCswitch_off(s%, RETURN E%)
2800  LOCAL P%, B%
2810  E%=FNchksw: IF E% ENDPROC
2820  P%=s%>>>3: B%=1<<(s%AND7)
2830  s%=(softport?P% EOR invtab?P%) AND NOT B% EOR invtab?P%
2840  softport?P% = s%
2850  PROCpagedig
2860  SYS osbyte, ?iocode+1, portab?P%, s%
2870  PROCrestpage
2880  ENDPROC
2890  :
2900  DEF PROCswitch_over(s%, RETURN E%)
2910  LOCAL P%, B%
2920  E%=FNchksw: IF E% ENDPROC
2930  P%=s%>>>3: B%=1<<(s%AND7)
2940  s%=softport?P% EOR B%
2950  softport?P% = s%
2960  PROCpagedig
2970  SYS osbyte, ?iocode+1, portab?P%, s%
2980  PROCrestpage
2990  ENDPROC
3000  :
3010  DEF PROCfree_switch(s%, RETURN E%)
3020  LOCAL P%, B%
3030  E%=FNchksw: IF E% ENDPROC
3040  P%=s%>>>3: B%=1<<(s%AND7)
3050  s%=softiodef?P% AND NOT B%
3060  softiodef?P%=s%
3070  PROCpagedig
3080  SYS osbyte, ?iocode+1, portab?P%+2, s%
3090  PROCrestpage
3100  ENDPROC
3110  :
3120  DEF PROCgovn_switch(s%, RETURN E%)
3130  LOCAL P%, B%
3140  E%=FNchksw: IF E% ENDPROC
```

```
3150  P%=s%>>>3: B%=1<<(s%AND7)
3160  s%=(softport?P% EOR invtab?P%) AND NOT B% EOR invtab?P%
3170  softport?P% = s%
3180  PROCpagedig
3190  SYS osbyte, ?iocode+1, portab?P%, s%
3200  s%=softiodef?P% OR B%
3210  softiodef?P%=s%
3220  SYS osbyte, ?iocode+1, portab?P%+2, s%
3230  PROCrestpage
3240  ENDPROC
3250  :
3260  DEF FNport(p%, RETURN E%)
3270  LOCAL D%
3280  E%=FNchkport: IF E% THEN =0
3290  PROCpagedig
3300  SYS osbyte, ?iocode, portab?p% TO ,,D%
3310  PROCrestpage
3320  = D% AND NOT softiodef?p% OR softport?p% AND softiodef?p% EOR invtab?p%
3330  :
3340  DEF PROCport(p%,D%, RETURN E%)
3350  E%=FNchkport: IF E% ENDPROC
3360  D%=D% EOR invtab?p%
3370  softport?p%=D%
3380  PROCpagedig
3390  SYS osbyte, ?iocode+1, portab?p%, D%
3400  PROCrestpage
3410  ENDPROC
3420  :
3430  DEFPROCgovn_port(p%, RETURN E%)
3440  PROCport(p%,0,E%)
3450  IF E% ENDPROC
3460  PROCpagedig
3470  softiodef?p%=&FF
3480  SYS osbyte, ?iocode+1, portab?p%+2, &FF
3490  PROCrestpage
3500  ENDPROC
3510  :
3520  DEFPROCfree_port(p%, RETURN E%)
3530  E%=FNchkport: IF E% ENDPROC
3540  PROCpagedig
3550  softiodef?p%=0
3560  SYS osbyte, ?iocode+1, portab?p%+2, 0
3570  PROCrestpage
3580  ENDPROC
3590  :
3600  DEFPROCpagedig
3610  onemegpage?1=?onemegpage
3620  ?onemegpage=dbase?1
3630  SYS osbyte, writefred, &FF, dbase?1
3640  ENDPROC
3650  :
3660  DEFPROCpagean
3670  onemegpage?1=?onemegpage
3680  ?onemegpage=abase?1
3690  SYS osbyte, writefred, &FF, abase?1
3700  ENDPROC
3710  :
3720  DEFPROCpageser
3730  onemegpage?1=?onemegpage
3740  ?onemegpage=sbase?1
3750  SYS osbyte, writefred, &FF, sbase?1
3760  ENDPROC
3770  :
```

```
3780  DEFPROCrestpage
3790  ?onemegpage=onemegpage?1
3800  SYS osbyte, writefred, &FF, ?onemegpage
3810  ENDPROC
3820  :
3830  DEFPROCdac(cX,VX, RETURN EX)
3840  EX=FNchkdac: IF EX ENDPROC
3850  cX=cX<<3 OR 8 OR cX<<1 AND 2
3860  PROCpagean
3870  SYS osbyte, writejim, cX, VX
3880  SYS osbyte, writejim, cX+1, VX>>>8
3890  PROCrestpage
3900  ENDPROC
3910  :
3920  DEFFNadc(cX, RETURN EX)
3930  LOCAL BX
3940  EX=FNchkadc: IF EX THEN =0
3950  BX=cX<<1 AND &F0
3960  PROCpagean
3970  SYS osbyte, writejim, BX, cX AND 7
3980  SYS osbyte, readjim, BX+2
3990  SYS osbyte, readjim, BX+1 TO ,,cX
4000  SYS osbyte, readjim, BX+2 TO ,,BX
4010  PROCrestpage
4020  = cX<<8 OR BX
4030  :
4040  DEFPROCio
4050  !amax=FNsetamax: IF !amax=-1 THEN !abase=0
4060  !smax=FNsetsmax: IF !smax=-1 THEN !sbase=0
4070  !dmax=FNsetdmax
4080  IF !dmax=-1 THEN
4090    IF FNtestvia(readsheila,&60) THEN
4100      !dbase=&FE60: !dmax=7: ?portab=&60: ?invtab=0: ?softiodef=0
4110      SYS osbyte, writesheila, &62, 0
4120      ?iocode=readsheila: !jimsheila=&3C2000-&60*4
4130    ELSE !dbase=0
4140    ENDIF
4150  ENDIF
4160  IF !dbase=0 AND !abase=0 AND !sbase=0 ERROR 0, "No I/O found"
4170  ?nmpipts=!dmax+1)>>3
4180  IF ?nmpipts>4 THEN ?nmpipts=4: REM extend later
4190  ENDPROC
4200  :
4210  DEFFNsetdmax
4220  LOCAL ZX
4230  ZX=0
4240  PROCpagedig
4250  WHILE FNtestvia(readjim,ZX) AND ZX<256
4260    softiodef?(ZX>>>3)=0: softiodef?((ZX>>>3)+1)=0
4270    SYS osbyte, writejim, ZX+2, 0
4280    SYS osbyte, writejim, ZX+3, 0
4290    ZX+=16
4300  ENDWHILE
4310  PROCrestpage
4320  =ZX-1
4330  :
4340  DEFFNtestvia(IX,OX)
4350  SYS osbyte, IX+1, OX+6, 0
4360  SYS osbyte, IX+1, OX+4, &55
4370  SYS osbyte, IX, OX+6 TO ,,OX
4380  IF OX=&55 THEN =TRUE ELSE =FALSE
4390  :
4400  DEFFNsetamax
4410  LOCAL ZX
```

```
4420  Z%=0
4430  WHILE FNtestan(Z%) AND Z%<128
4440      Z%+=16
4450  ENDWHILE
4460  =(Z%>>>1)-1
4470  :
4480  DEFFNtestan(Z%)
4490  PROCpagean
4500  SYS osbyte, readjim, Z% TO ,,Z%
4510  PROCrestpage
4520  IF Z%=1 THEN =TRUE ELSE =FALSE
4530  :
4540  DEFFNsetsmax
4550  LOCAL Z%
4560  Z%=0
4570  WHILE FNtestser(Z%) AND Z%<32
4580      Z%+=32
4590  ENDWHILE
4600  =Z%-1
4610  :
4620  DEFFNtestser(Z%)
4630  PROCpageser
4640  Z%=0
4650  PROCrestpage
4660  IF Z% THEN =TRUE ELSE =FALSE
4670  :
4680  DEFFNdmax=!dmax
4690  DEFFNamax=!amax
4700  DEFFNsmax=!smax
4710  DEFFNdbase=!dbase
4720  DEFFNabase=!abase
4730  DEFFNsbase=!sbase
4740  DEFFNpipes=pipes%
4750  DEFFNreport(R%)=report$(R% AND 127)
4760  :
>
```

LISTING 3

```
10 REM > ]giprog.perfuseq  - created: Mon,14 May 1990.17:19:23
20 DIM countonx(31),countoffx(31)
30 DIM L$(31),vx(31)
40 PROCinit
50 PROCarachnidprogram
60 END
70 :
80 DEFPROCarachnidprogram
90 LOCAL q%
100 LOCAL ERROR
110 ON ERROR LOCAL PROCerror:ENDPROC
120 PROCkill_all
130 L$()=STRING$(10," ")
140 L$(0)=">start    ":start=0:PROCfree_switch(start,E%)
150 L$(4)="<pump_a   ":pump_a=4:PROCgovn_switch(pump_a,E%)
160 L$(5)="<pump_b   ":pump_b=5:PROCgovn_switch(pump_b,E%)
170 L$(6)="<stim     ":stim=6:PROCgovn_switch(stim,E%)
180 L$(7)="<fraction ":fraction=7:PROCgovn_switch(fraction,E%)
190 L$(1)=">stop     ":stop=1:PROCfree_switch(stop,E%)
200 q%=FNstart
210 PROCwait(E%):IF E% ERROR E%,FNreport(E%)
220 PROCresults
230 ENDPROC
240 :
250 DEFFNstart
260 PROCpipe_switch(start,On,0,"FNstart_switch1(",0,E%)
270 PROCpipe_switch(stop,On,0,"FNstop_switch1(",0,E%)
280 =0
290 :
300 DEFFNstart_switch1(P%,R%)
310 IF R%=0 =0
320 countonx(start)+=1
330 PROCkill_switch(start,E%)
340 PROCpipe_timer(start,800,0,"FNstart_timer2(",0,E%)
350 PROCswitch_on(pump_a,E%):countonx(pump_a)+=1
360 PROCswitch_on(fraction,E%):countonx(fraction)+=1
370 PROCpipe_timer(fraction,20,0,"FNfraction_timer1(",0,E%)
380 =0
390 :
400 DEFFNfraction_timer1(P%,R%)
410 IF R%=0 =0
420 PROCswitch_off(fraction,E%):countoffx(fraction)+=1
430 =0
440 :
450 DEFFNstart_timer2(P%,R%)
460 IF R%=0 =0
470 PROCpipe_timer(start,800,0,"FNstart_timer3(",0,E%)
480 PROCswitch_on(stim,E%):countonx(stim)+=1
490 PROCpipe_timer(stim,200,0,"FNstim_timer1(",0,E%)
500 PROCswitch_on(fraction,E%):countonx(fraction)+=1
510 PROCpipe_timer(fraction,20,0,"FNfraction_timer2(",0,E%)
520 =0
530 :
540 DEFFNfraction_timer2(P%,R%)
550 IF R%=0 =0
560 PROCswitch_off(fraction,E%):countoffx(fraction)+=1
570 =0
580 :
590 DEFFNstim_timer1(P%,R%)
600 IF R%=0 =0
610 PROCswitch_off(stim,E%):countoffx(stim)+=1
620 =0
630 :
```

```
 640 DEFFNstart_timer3(P%,R%)
 650 IF R%=0 =0
 660 PROCpipe_timer(start,800,0,"FNstart_timer4(",0,E%)
 670 PROCswitch_on(fraction,E%):countonx(fraction)+=1
 680 PROCpipe_timer(fraction,20,0,"FNfraction_timer3(",0,E%)
 690 =0
 700 :
 710 DEFFNfraction_timer3(P%,R%)
 720 IF R%=0 =0
 730 PROCswitch_off(fraction,E%):countoffx(fraction)+=1
 740 =0
 750 :
 760 DEFFNstart_timer4(P%,R%)
 770 IF R%=0 =0
 780 PROCpipe_timer(start,800,0,"FNstart_timer5(",0,E%)
 790 PROCswitch_off(pump_a,E%):countoffx(pump_a)+=1
 800 PROCswitch_on(pump_b,E%):countonx(pump_b)+=1
 810 PROCswitch_on(fraction,E%):countonx(fraction)+=1
 820 PROCpipe_timer(fraction,20,0,"FNfraction_timer4(",0,E%)
 830 =0
 840 :
 850 DEFFNfraction_timer4(P%,R%)
 860 IF R%=0 =0
 870 PROCswitch_off(fraction,E%):countoffx(fraction)+=1
 880 =0
 890 :
 900 DEFFNstart_timer5(P%,R%)
 910 IF R%=0 =0
 920 PROCpipe_timer(start,800,0,"FNstart_timer6(",0,E%)
 930 PROCswitch_on(stim,E%):countonx(stim)+=1
 940 PROCpipe_timer(stim,200,0,"FNstim_timer2(",0,E%)
 950 PROCswitch_on(fraction,E%):countonx(fraction)+=1
 960 PROCpipe_timer(fraction,20,0,"FNfraction_timer5(",0,E%)
 970 =0
 980 :
 990 DEFFNfraction_timer5(P%,R%)
1000 IF R%=0 =0
1010 PROCswitch_off(fraction,E%):countoffx(fraction)+=1
1020 =0
1030 :
1040 DEFFNstim_timer2(P%,R%)
1050 IF R%=0 =0
1060 PROCswitch_off(stim,E%):countoffx(stim)+=1
1070 =0
1080 :
1090 DEFFNstart_timer6(P%,R%)
1100 IF R%=0 =0
1110 PROCpipe_timer(start,800,0,"FNstart_timer7(",0,E%)
1120 PROCswitch_on(fraction,E%):countonx(fraction)+=1
1130 PROCpipe_timer(fraction,20,0,"FNfraction_timer6(",0,E%)
1140 =0
1150 :
1160 DEFFNfraction_timer6(P%,R%)
1170 IF R%=0 =0
1180 PROCswitch_off(fraction,E%):countoffx(fraction)+=1
1190 =0
1200 :
1210 DEFFNstart_timer7(P%,R%)
1220 IF R%=0 =0
1230 PROCswitch_off(pump_b,E%):countoffx(pump_b)+=1
1240 =FNstart
1250 :
1260 DEFFNstop_switch1(P%,R%)
1270 IF R%=0 =0
```

```
1280 PROCkill_switch(start,E%)
1290 PROCkill_timer(start,E%)
1300 PROCswitch_off(pump_a,E%):countoff%(pump_a)+=1
1310 PROCswitch_off(pump_b,E%):countoff%(pump_b)+=1
1320 PROCswitch_off(stim,E%):countoff%(stim)+=1
1330 PROCkill_timer(stim,E%)
1340 PROCswitch_off(fraction,E%):countoff%(fraction)+=1
1350 PROCkill_timer(fraction,E%)
1360 counton%(stop)+=1
1370 PROCkill_switch(stop,E%)
1380 =0
1390 :
1400 DEFPROCresults
1410 LOCAL i%,j%,k%
1420 PRINT'''"  SWITCH          ON&       OFF&       SWITCH      ON&       OFF&"'
1430 j%=0
1440 FOR i%=0 TO 31
1450    IF L$(i%)<>"          " THEN v%(j%)=i%:j%+=1
1460 NEXT
1470 j%+=1
1480 FOR k%=0 TO j%DIV2-1
1490    FOR i%=0 TO j%DIV2 STEP j%DIV2
1500       IF i%+k%<j%-1 THEN
1510          IF i% PRINT"     ";
1520          PRINT" ";L$(v%(i%+k%));
1530          IF LEFT$(L$(v%(i%+k%)),1)=">" PRINT"     ";
1540          PRINTFNdecalign(counton%(v%(i%+k%)));
1550          IF LEFT$(L$(v%(i%+k%)),1)="<" THEN
1560             PRINTFNdecalign(countoff%(v%(i%+k%)));
1570          ELSE
1580             PRINT"     ";
1590          ENDIF
1600       ENDIF
1610    NEXT
1620    PRINT
1630 NEXT
1640 ENDPROC
1650 :
1660 DEFFNdecalign(d%)=RIGHT$("        "+STR$(d%),9)
1670 :
1680 DEFPROCerror
1690 IF (ERR AND &FF)=17 THEN PROCresults
1700 REPORT:PRINT" at line ";ERL
1710 ENDPROC
>
```

I claim:

1. An event based apparatus for controlling with an independent set of program instructions a real-time process governed by causes and effects comprising:

input means for producing input information in the form of selectable data representing the causes and effects;

image display means for displaying a timing chart visually representing a data structure corresponding to the causes and effects which in turn correspond to input and output signals desired to control the real time process;

processor means responsively coupled to the input means for producing the data structure, the image display means being responsively coupled to the processor means and the input means, said processor means including:

storage means responsive to the input means for storing the data structure corresponding to the causes and effects in the real-time process, said input means operative when activated for entering the selectable data into said data structure for storage;

means responsive to the input means for creating the timing chart of selectively variable input and output signals for display on said image display means;

means responsive to input and output signals of the means for creating the timing chart for producing the data structure;

means responsively coupled to the storage means for converting the stored data structure to the set of program instructions for monitoring the input signals and producing the output signals, said instructions being operative when executed to produce the causes and effects for governing the real-time process; and means responsive to the instructions for controlling the real-time process by processing the set of program instructions.

2. The apparatus of claim 1 wherein the processor means comprises a general purpose computer including a central processing means.

3. The apparatus of claim 1 wherein the timing chart includes at least one of a waiting state and a recycling state.

4. An apparatus according to claim 1, wherein the timing chart is a visual representation of a data structure from which the instruction set is generated.

5. Apparatus according to claim 1, including a computer processor and wherein the image display means comprises a visual display unit of the computer, and the means for creating and/or editing the timing chart comprises a keyboard and/or computer mouse together with the computer processor when programmed appropriately.

6. An apparatus according to claim 1, wherein the instruction set generated is in the form of a computer program which may be saved to a conventional storage medium such as a magnetic disk.

7. An apparatus according to claim 1, wherein the program is generated at one location where the appropriate apparatus is present and run on another computer processor at a separate location.

8. An event based apparatus for controlling with an independent set of program instructions a real-time process governed by causes and effects comprising:

input means for providing input information including selectable data representing the causes and effects;

image display means for displaying a timing chart visually representing a data structure corresponding to the causes and effects and wherein said cause and effects correspond to input and output signals desired to control the real time process;

processor means responsively coupled to the input means for producing the data structure, the display means being responsively coupled to the processor means and the input means, said processor means including;

storage means responsive to the input means for storing the data structure corresponding to the causes and effects in the real-time process, said input means operative when activated for entering the selectable data into said data structure for storage;

means responsive to the input means for creating the timing chart of selectively variable input and output signals for display on said image display means;

means responsive to input and output signals of the means for creating the timing chart for producing the data structure; and means responsively coupled to the storage means for converting the stored data structure to the set of program instructions for monitoring the input signals and producing the output signals, said instructions when executed being operative to produce the causes and effects for governing the real-time process.

9. An apparatus according to claim 8, wherein the timing chart is a visual representation of a data structure from which the instruction set is generated.

10. Apparatus according to claim 8, including a computer processor and wherein the image display means comprises a visual display unit of the computer, and the means for creating and/or editing a timing chart comprises a keyboard and/or computer mouse together with the computer processor when programmed appropriately.

11. An apparatus according to claim 8, wherein the instruction set generated is in the form of a computer program which may be saved to a conventional storage medium such as a magnetic disk.

12. An apparatus according to claim 8, wherein the program is generated at one location where the appropriate apparatus is present and run on another computer processor at a separate location.

13. A method for producing in a computer an independent, executable instruction set for controlling on an event basis a real-time process governed by causes and effects comprising the steps of:

entering selectable input data representative of the causes and effects into said computer including a timing chart representative of selectively variable input and output signals desired to control the real time process;

displaying the timing chart, which timing chart visually represents a data structure corresponding to the causes and effects and wherein the causes and effects correspond to the input and output signals desired to control the real-time process;

producing in the computer the data structure corresponding to the timing chart of input and output signals;

storing the data structure; and converting the stored data structure to the set of program instructions for monitoring the input signals and producing the output signals, said instructions when executed for producing the causes and effects for governing the real-time process.

14. The method of claim 13 comprising introducing at least one of a waiting state and recycling state into said timing chart.

15. A method according to claim 13, wherein the timing chart is a visual representation of a data structure from which the instruction set is generated.

16. A method according to claim 13, wherein the instruction set generated is in the form of a computer program which may be saved to a conventional storage medium such as a magnetic disk.

17. A method according to claim 13, wherein the program is generated at one location where the appropriate apparatus is present and run on another computer processor at a separate location.

18. Apparatus for controlling with an independent set of program instructions a real-time process governed by events in the form of causes and effects comprising:

a general purpose computer, including:

input means for producing input information in the form of selectable data representing the causes and effects;

image display means for displaying information in the form of a timing chart being a visual representation of a data structure corresponding to the causes and events which in turn correspond to input and output signals desired to control the real time process;

processor means responsively coupled to the input means for producing the structure, the display means operatively coupled to the processor means and the input means, said processor means including:

storage means responsively coupled to the input means for storing the data structure, said input means operative when activated for entering the selectable data into the data structure for storage;

means responsive to the input means and the processor means for producing an output corresponding to the timing chart for display on the display means;

means responsive to the output corresponding to the timing chart for creating the timing chart and for producing the corresponding data structure; and means responsively coupled to the storage means for converting the stored data structure to the set of coded program instructions operative when executed for monitoring the input signals and producing the output signals corresponding to the events to thereby produce the causes and effects governing the real-time process when run on a suitable computer.

\* \* \* \* \*

UNITED STATES PATENT AND TRADEMARK OFFICE
CERTIFICATE OF CORRECTION

PATENT NO. : 5,621,639
DATED : April 15, 1997
INVENTOR(S) : Paul J. FRAY

It is certified that error appears in the above-indentified patent and that said Letters Patent is hereby corrected as shown below:

On the title page, item [63], after "abandoned", add --, filed as PCT/GB 90/00850, Jun. 1, 1990--.

Signed and Sealed this

Second Day of September, 1997

Attest:

BRUCE LEHMAN

Attesting Officer

Commissioner of Patents and Trademarks